(12) United States Patent
Agerstam et al.

(10) Patent No.: US 10,678,938 B2
(45) Date of Patent: Jun. 9, 2020

(54) TRUSTWORTHY PERIPHERAL TRANSFER OF OWNERSHIP

(71) Applicant: Intel Corporation, Santa Clara, CA (US)

(72) Inventors: Mats Gustav Agerstam, Portland, OR (US); Ned M. Smith, Beaverton, OR (US); Sachin Agrawal, Hillsboro, OR (US); Sebastian Salomon, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 251 days.

(21) Appl. No.: 15/941,846

(22) Filed: Mar. 30, 2018

(65) Prior Publication Data

US 2019/0042779 A1 Feb. 7, 2019

(51) Int. Cl.
| | |
|---|---|
| G11C 7/00 | (2006.01) |
| G06F 17/00 | (2019.01) |
| G06F 13/00 | (2006.01) |
| G06F 12/14 | (2006.01) |
| G06F 12/00 | (2006.01) |
| G06F 7/04 | (2006.01) |

(Continued)

(52) U.S. Cl.
CPC ........ G06F 21/6218 (2013.01); G06F 13/102 (2013.01); G06F 21/554 (2013.01); G06F 21/575 (2013.01); G06F 21/82 (2013.01)

(58) Field of Classification Search
CPC .. G06F 21/6218; G06F 13/102; G06F 21/554; G06F 21/575; G06F 21/82
USPC ........................................................ 726/17
See application file for complete search history.

(56) References Cited

U.S. PATENT DOCUMENTS

2015/0006761 A1* 1/2015 Miller ..................... G06F 21/52
710/3
2016/0127391 A1* 5/2016 Kobres ............... H04L 63/1416
(Continued)

FOREIGN PATENT DOCUMENTS

| CN | 110321741 | 10/2019 |
| DE | 102019103890 | 10/2019 |

OTHER PUBLICATIONS

Amit Vasudevan, Trustworthy Execution on Mobile Devices: What security properties can my mobile platform give me? IEEE:2011; p. 1-17.*

*Primary Examiner* — Monjur Rahim
(74) *Attorney, Agent, or Firm* — Schwegman Lundberg & Woessner, P.A.

(57) ABSTRACT

Systems and techniques for trustworthy peripheral transfer of ownership are described herein. A unique peripheral identifier may be received from an ownership manifest of the peripheral device. The unique peripheral identifier may be transferred to a bus controller for a bus between the computing device and the peripheral device. A measurement may be received from the peripheral device by the basic input and output system of the computing device. A measurement of a computing platform of the computing device may be generated. The measurement may indicate peripheral devices interconnected to the computing device. Data transfer between the peripheral device and the computing device may be allowed via the bus based on validation of the measurement of the computing platform against a platform configuration register of the computing device.

23 Claims, 8 Drawing Sheets

(51) Int. Cl.
*G06F 21/62* (2013.01)
*G06F 13/10* (2006.01)
*G06F 21/57* (2013.01)
*G06F 21/55* (2013.01)
*G06F 21/82* (2013.01)

(56) References Cited

U.S. PATENT DOCUMENTS

2016/0182448 A1* 6/2016 Kobres ................ H04L 63/164
                                                            726/14
2016/0306769 A1* 10/2016 Kohtz ..................... H04W 4/50
2017/0075405 A1* 3/2017 Jensen .................... G06F 1/325
2017/0078300 A1* 3/2017 He ........................ H04L 63/102

* cited by examiner

TRUSTWORTHY PERIPHERAL TRANSFER OF OWNERSHIP

TECHNICAL FIELD

Embodiments described herein generally relate to secure peripheral device onboarding and, in some embodiments, more specifically to trustworthy peripheral transfer of ownership.

BACKGROUND

A computing device may interact with a variety of peripheral devices such as printers, sensor devices, mobile devices, etc. The computing device may be interconnected with the peripheral device via a wired connection (e.g., universal serial bus, etc.) or may be connected via a wireless connection (e.g., 802.11x wireless network, etc.). Internet of things (IoT) devices may be dispersed throughout an environment in which the computing device operates and may interact with the computing device via wireless network. IoT devices may be dispersed some distance from where the computing device operates making it difficult to identify which IoT peripherals are connected to the computing device. This may provide opportunity for compromising the computing device by presenting a rouge IoT device for connection to the computing device.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
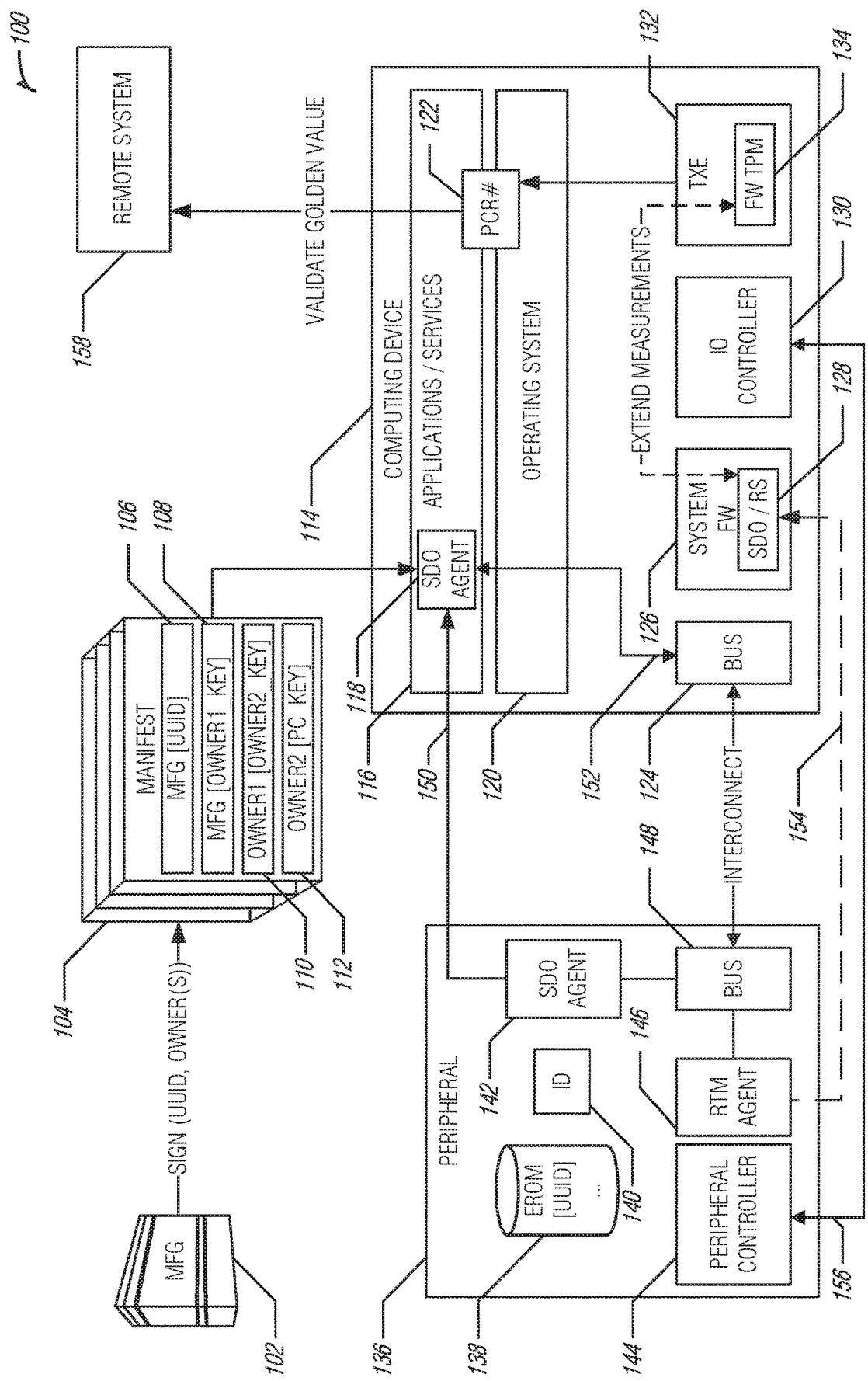
FIG. 1 is a block diagram of an example of a system for onboarding a peripheral device with a computing device for trustworthy peripheral transfer of ownership, according an embodiment.

In internet of things (IoT) trusted computing, it is becoming increasingly important to help protect systems and data from malicious attacks and adversaries. Several standardization efforts are underway or defined to address the issue of malicious attacks in IoT computing systems. One way to protect systems and data is to trust peripheral devices (e.g., sensors, actuators, etc.) connected to a physical platform over a bus/interconnect and associated data transferred over the bus/interconnect. The techniques and systems discussed herein present a novel mechanism to establish trustworthiness of peripherals during initial device onboarding leveraging secure device onboarding semantics via system firmware (e.g., basic input/output system (BIOS), unified extensible firmware interface (UEFI), etc.) and trusted platform module (TPM) measurements in order to ensure that only authorized peripherals are attached to the system and data emanating from those peripherals can be trusted. While TPM is used in the examples provided, other modules and secure frameworks may be used to collect and report configuration status such as, for example, a mobile trusted module (MTM), Trusted Computing Group (TCG) device identifier composition engine (DICE) module, etc.

Traditional secure input/output (I/O) focuses on a trusted path between a peripheral device and a trusted execution environment which may involve a proprietary and dedicated hardware path that exists between them. Alternatively, the peripheral embeds some type of hardware anchored secret over a conventional interface over which the peripheral device may be onboarded and keys may be established between them. Both mechanisms described above have disadvantages when it comes to cost and labor involved to enable those solutions and may not lead to an industrial open standard.

The techniques and systems discussed herein include a mechanism in which a peripheral device may be onboarded using an identifier such as, for example, an enhanced privacy identification (EPID) identifier, TCG DICE identifier, Institute of Electrical and Electronics Engineers (IEEE) 802.11AR identifier, and other identifiers based on asymmetric keys, and leveraging secure device onboarding primitives in order for the platform to take ownership of the peripheral device connected to a computing device over some bus fabric (e.g., inter-integrated circuit (I2C), peripheral component interconnect express (PCI-e), etc.). The platform may in turn possess a device identifier wherein the platform may be onboarded into a domain or network controlled by a network owner or user. For example, the platform may be onboarded to a domain directory structure and may be provided an identifier during onboarding to identify the platform with the domain directory structure. Peripherals onboarded to the platform may be identified as owned by the platform and may inherit ownership from the network owner or user.

In an example, the system firmware takes the role of the secure device onboarding entity to onboard a peripheral device with the TPM assisting in creating a unique fingerprint of the current system configuration (e.g, the connected peripherals and their respective unique identifier). The system configuration may later be asserted remotely (e.g., via remote attestation through comparison to a known good configuration fingerprint) to ensure correct operation of the system. This may guard against malicious attacks and non-malicious operational errors by verifying that the current configuration state matches a known good configuration state.

After the computing device is configured as an owner of the peripheral device, the peripheral device may authenticate to the computing device and vice versa using protocols (e.g., IEEE standard 1667 or TCG Opal, etc.) for peripheral access before data is read to/written from the peripheral device.

Extending secure device onboarding technology to enable secure onboarding of peripherals and measuring the system state for remote attestation via measurements helps to enable progress towards zero-touch onboarding with increased security and trusted computing standards. Rogue peripherals, including those that masquerade as different device types to avoid detection may be detected by the computing device and denied access to load/enumerate to the system firmware. These features may be implemented across platforms without utilizing proprietary components.

FIG. 1 is a block diagram of an example of a system 100 for onboarding (e.g., initial owner configuration, ownership-transfer, etc.) a peripheral device 136 with a computing device 114 for trustworthy peripheral transfer of ownership, according to an embodiment.

The system 100 may include a peripheral device 136 that may be produced by a manufacturer 102. At manufacturing, a manifest 104 may be created and included (e.g., embedded in a memory device, in a chip, programmed, etc.) in the peripheral device 136. During manufacturing, a manufacturer 102 ownership record 106 may be created in the manifest 104 that includes a universally unique identifier (UUID) of the manufacturer 102. The peripheral device 136 may be issued identifier (ID) (e.g., EPID identifier, TCG DICE identifier, IEEE 802.11AR identifier, etc.) key 140 and a UUID that may be embedded in a secure memory device 138. The peripheral device 136 may include a peripheral controller 144, a peripheral secure device onboarding agent 142, a restricted transactional memory (RTM) agent 146, and a peripheral device 136 bus 148.

The computing device 114 may include a variety of components operating in hardware and software layers. The computing device 114 may include an applications and services software layer 116 that may include a computing device 114 secure device onboarding agent 118. The computing device 114 may include an operating system software layer 120 that may include instructions for providing user interfaces and hardware interoperability and control. A platform configuration register (PCR) 122 may be interconnected between the application and services software layer 116 and the operating system software layer 120 to record (e.g., measure, etc.) configuration states of the software layers. The computing device 114 may include a trusted execution environment 132 that may include a firmware trusted platform module (TPM) 134, and input/output (IO) controller 130, system firmware (e.g., basic input/output system (BIOS), unified extensible firmware interface (UEFI), etc.) 126 that may include a system firmware 126 secured device onboarding and rendezvous server 128, and a computing device 114 bus 124. The peripheral device 136 bus 148 and the computing device 114 bus 124 may operate according to various device interconnection protocols such as, for example, IEEE 1667, TCG Opal, etc.

Traditionally, the peripheral device 136 may be a printer, scanner, or other device connected to the computing device 114. As technology has progressed, peripheral devices have expanded to include sensor devices such as temperature sensors, security devices, fingerprint scanners, and other devices connected to a computing platform such as those operating in IoT networks and beyond. Thus, the peripheral device 136 may be a traditional peripheral device or a modern peripheral device operating in an IoT network or other network computing platform. Likewise, the computing device 114 may be operating in an IoT network or other network computing platform.

During onboarding of the peripheral device 136, the system firmware 126 performs secure device onboarding operations from the perspective of the computing device 114. The peripheral device 136 uses its ID key 140 to sign its UUID and sends the signed UUID 150 to the computing device 114 secure onboarding agent 118 via the peripheral secure device onboarding agent 142. The UUID may be retrieved from the manifest 104 and may be embedded in the secure memory device 138. The computing device 114 may receive a unique peripheral identifier from the manifest 104 of the peripheral device 136. In an example, the unique peripheral identifier is signed with a key of the peripheral device 136. The unique peripheral identifier may be transferred to a bus controller for a bus between the computing device 114 bus 124 and the peripheral device 136 bus 148.

For example, the system firmware 126 may act as a rendezvous server 128 as the bus interconnect is used as the data transport between the peripheral device 136 bus 148 and the computing device 114 bus 124. During device onboarding, the peripheral device 136 may assert that the computing device 114 is legitimate because the computing device 114 is listed (e.g., as a record, etc.) in the manifest 104 that has been signed throughout the supply chain (e.g., a public key of the computing device 114 has been signed). The computing device 114 secure device onboarding agent 118 may communicate 152 with the computing device 114 bus 124 to verify the identity of the peripheral device 136 before exchanging data over the bus interconnect. The computing device 114 may assert that the peripheral device 136 is legitimate based on the UUID of the peripheral device 136 identified in the manifest 104.

For example, the manifest 104 may be signed by the manufacturer 102 of the peripheral device 136 at the time of manufacture resulting in the creation of a manufacturer 102 ownership record 106. A record may be generated in the manifest 104 each time an ownership transfer is completed. For example, ownership may be transferred from the manufacturer 102 to Owner 1 and the transfer may be recorded in a first ownership transfer record 108. Subsequently, ownership of the peripheral device 136 may be transferred from Owner 1 to Owner 2 which may be recorded in a second ownership transfer record 110 in the manifest 104. Owner 2 may configure the peripheral device 136 to interconnect with the computing device 114 and a third ownership transfer record 112 may record ownership by the computing device 114.

As part of device onboarding, the computing device 114 may assign a computing device-specific UUID value (e.g., device-UUID) that may be used to identify the peripheral device 136 during its tenure as a peripheral of the computing device 114. If the peripheral device 136 is removed at some point from the computing device 114 and inserted into another computing device (e.g., a computing device other than computing device 114), the other computing device may establish its own computing device-specific UUID (e.g., device-UUID2) that is revealed to the other computing device when challenged.

A site owner or other administrator may designate which computing devices may be configured as owners of the peripheral device 136 by signing a PC1_key and a PC2_key and adding the keys to the manifest 104. This may act as proof that the peripheral device 136 belongs to the computing device 114. Based on verified ownership of the peripheral device 136 and other peripherals that have been onboarded, the system firmware 126 may perform a set TPM measurements (e.g., using the firmware TPM 134) based on TPM_Extend( ) using the unique UUID of the peripheral device 136 and the other onboarded peripherals.

The computing device 114 may be issued a local key during onboarding with a domain, network, server, etc. The peripheral device 136 may generate a local asymmetric key which may include a hash of the peripheral device 136 firmware. The local asymmetric key may be used to sign the UUID of the peripheral device 136 as part of a certificate signing request (CSR) message that is sent to the computing device 114.

The computing device 114 may use a local key that was previously issued to the computing device 114 by the site owner (e.g., network/domain owner, server agent, etc.). The local key may be used to sign the UUID of the peripheral device 136 received in the certificate signing request establishing a cryptographic signature chain linking the peripheral device 136 to the computing device 114. By extension the signature establishes that the peripheral device 136 is also owned by the site owner by way of the computing device 114 (e.g., based on the local key of the computing device 114 being issued by the site owner.

It may be considered as part of the key provisioning step that the computing device 114 may provision a whitelist of other computing device 114 UUIDs or site owner trust anchor (e.g., a public key hash, etc.) that is provisioned to the peripheral device 136 so as to establish a set of alternative computing devices with which the peripheral device 136 may be successfully onboarded. Therefore, it is possible for the peripheral device 136 to be shared across multiple computing devices or platforms of the same (or different) domain wherein ownership of the computing device 114 or platform is previously established.

Figure 2:
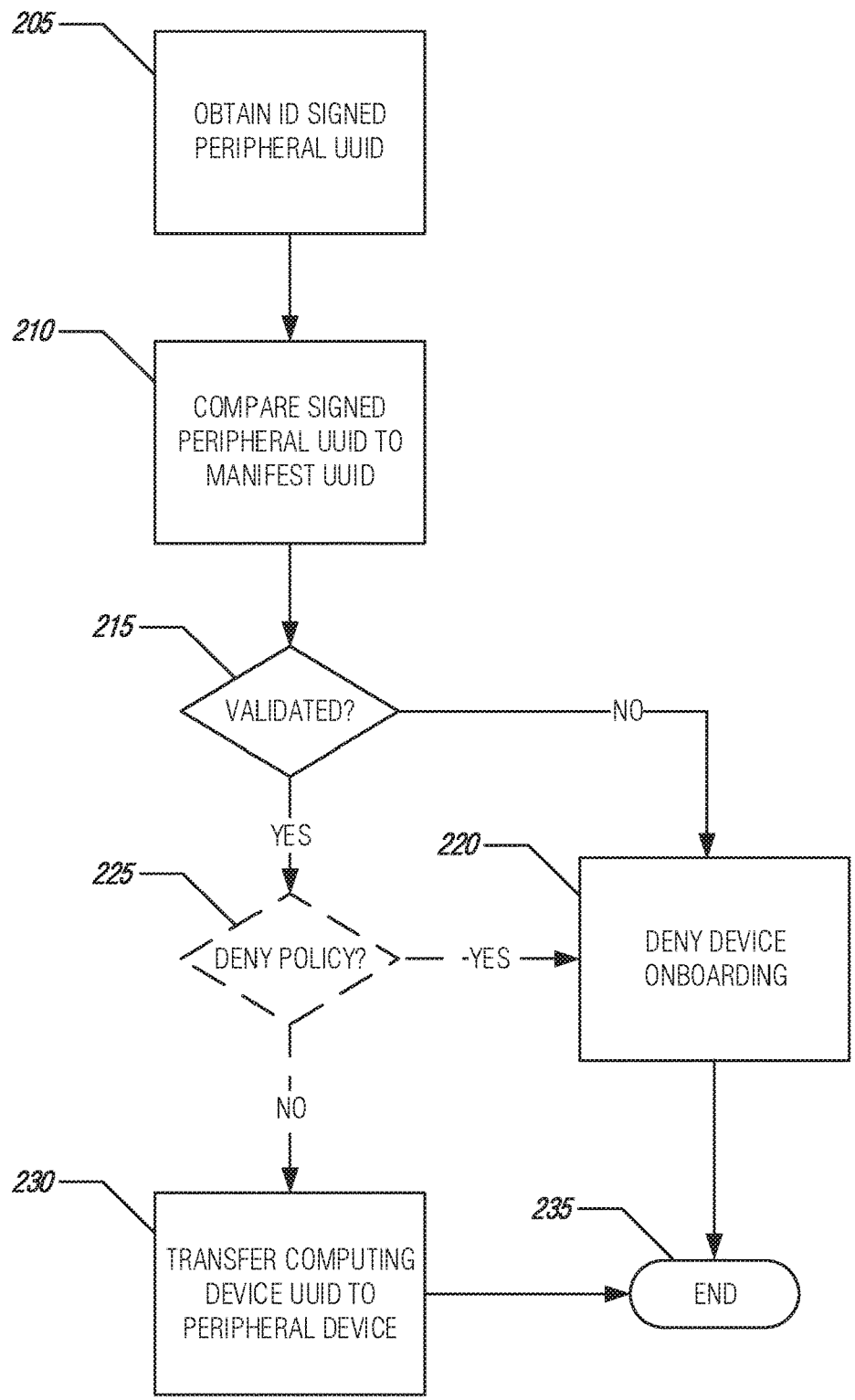
FIG. 2 illustrates a flow diagram of an example of a process of peripheral and computing device identifier exchange for trustworthy peripheral transfer of ownership, according to an embodiment.

FIG. 2 illustrates a flow diagram 200 of an example of a process of peripheral and computing device identifier exchange for trustworthy peripheral transfer of ownership, according to an embodiment.

At operation 205, a UUID of the peripheral device 136 signed using the ID key 140 of the peripheral device 136 may be obtained. The signed peripheral UUID may be compared to the UUID for the peripheral device 136 included in a record in the manifest 104 at operation 210. If the UUID is validated at decision 215, the UUID of the computing device 114 may be transferred to the peripheral device 136 (e.g., to be entered as an owner record in the manifest 104). If the UUID of the peripheral device 136 is not validated at decision 215, onboarding of the peripheral device 136 is denied at operation 220. The UUID exchange process ends at operation 235.

In an example, policies may be used to identify peripheral devices that may and may not be onboarded to the computing device 114. For example, peripheral onboarding lists such as a blacklist including peripheral devices (e.g., device types, specific devices, particular device configurations, etc.) that may not be onboarded, a whitelist including peripheral devices that are allowed to be onboarded to the computing device 114, and a gray list (a physical list or a virtual list) including peripheral devices that are neither allowed nor denied may be maintained for the computing device 114. If a peripheral device (e.g., peripheral device 136, etc.) is denied at decision 225, the process continues to operation 220 and onboarding of the device will be denied. If a peripheral device (e.g., peripheral device 136, etc.) is allowed at decision 225, the process continues at operation 230 and the UUID of the computing device 114 will be transferred to the peripheral device (e.g., peripheral device 136, etc.).

In an example, the policies may include rules for onboarding gray list peripheral devices. If a peripheral device (e.g., peripheral device 136, etc.) is determined to be a gray list device at decision 225, a notification may be transmitted to a user interface of a user or an administrator to determine whether the peripheral device (e.g., peripheral device 136, etc.) should be allowed to onboard with the computing device 114. In other examples, a decision tree or other decision-making facility may be used to automatically determine whether a gray list device should be allowed to onboard with the computing device 114.

Returning to the description of FIG. 1, when the peripheral device 136 is enumerated by the system firmware 126 or other firmware as part of system power on or reset, the RTM agent 146 of the peripheral device 136 measures the peripheral firmware (which may include measurable parts of the peripheral secure device onboarding agent 142). The RTM Agent 146 is trusted to compute a measurement because its measurement logic is embedded in the secure memory device 138 of the peripheral device 136 along with the UUID of the peripheral device 136. In some embodiments of the UUID, the firmware measurement may be used to generate the UUID so that a binding exists between the UUID and the firmware that is specific to the type of device/peripheral being tracked. As part of peripheral device 136 enumeration, the ID key 140 is used to sign the measurement produced by the RTM Agent 146 which is sent 154 to the system firmware 126 secured device onboarding and rendezvous server 128 of the computing device 114.

A measurement may be received from the peripheral device 136 by the system firmware 126 of the computing device 114. A measurement of a computing platform of the computing device 114 may be generated. The measurement may indicate peripheral devices, such as peripheral device 136, interconnected to the computing device 114.

TPM_Extend extends the system firmware 126/Bootloader/OS kernel measurement with either additional measurements or new measurements. For example, if the current measurement is Mp, and there are peripherals, s1, s2, ... sn, the peripherals may provide their own unique identifier based on UUID over the bus/interconnect type (e.g., i2c, block transfer, PCI, USB, etc.), the UUIDs may be id1, id2, ... idn. All the measurements up to p have been rooted in the firmware TPM 134 since the system firmware 126 initial boot block (IBB) measurement, the next measurement, for s1, would be denoted Mp+1, and would be calculated as: Mp+1=TPM_Extend (Mp, SHA-256(id1)). The measurement would continue to be extended for each additional peripheral for example, Mp+2=TPM_Extend (M+1, SHA-256(id2)); ... ; Mp+n=TPM_Extend(Mp+n, SHA-256(idn)). This may result in the generation of a new golden value for the extended measurement after each peripheral is onboarded.

In an example, an initial boot block measurement may be generated for the computing platform of the computing device 114. The initial boot block measurement may be extended using a measurement from the peripheral device 136. The measurement of the computing platform may be the extended initial hoot block measurement. In an example, the initial boot block measurement may be generated by a trusted platform module of the computing device 114.

The resulting golden value (e.g., known good, etc.) of the measurements performed by the TPM 134 may be used to identify a trusted system state (e.g., verified as a valid configuration, etc.), as far as connected peripherals is concerned. This enables for remote attestation use-cases of the system to ensure it is compliant to defined policies, such as, for example, making sure that certain/any additional peripherals are not being used, peripherals a not being replaced or otherwise tampered with, etc. The system firmware 126 logs these measurements into an event log (e.g., a TCG event log, etc.). A remote server 158 may retrieve a PCR value from the PCR 122 and may consult the event log to securely determine the active peripherals on the platform. The TPM measurements are extended up to the operating system and services through the PCR 122. To maintain the trustworthiness of peripherals detected after system boot, the operating system software layer 120 kernel may extend the PCR values when a new peripheral device is detected and may initiate remote attestation with the remote server 158.

In an example, a platform configuration value may be retrieved from a remote attestation server (e.g., remote server 158). The current measurement of the computing platform may be compared to the retrieved platform configuration value. The current measurement of the computing platform may be validated based on the comparison and the data transfer between the computing device 114 and the peripheral device 136 may be allowed, at least in part, based on the validation.

Figure 3:
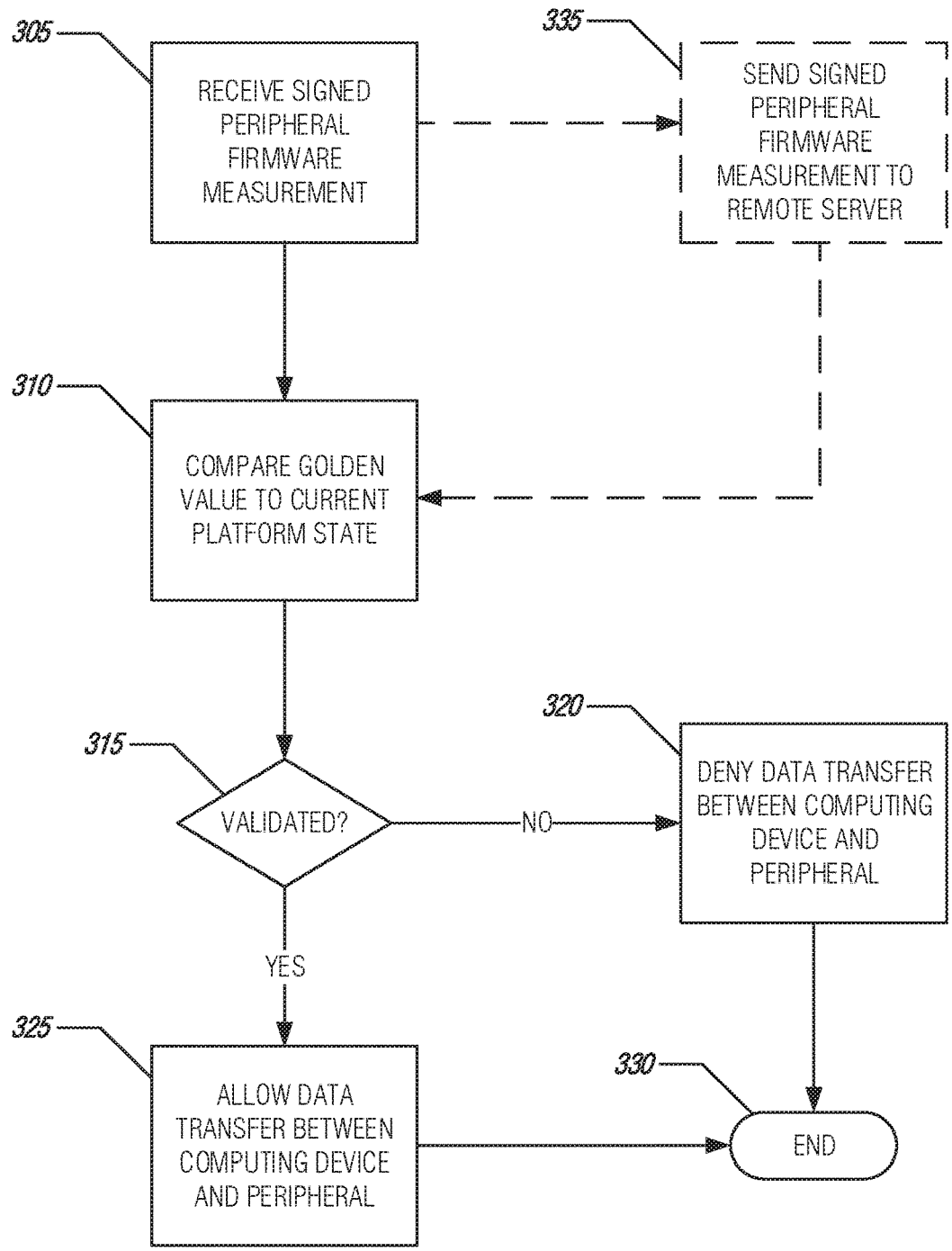
FIG. 3 illustrates a flow diagram of an example of a platform state validation process for trustworthy peripheral transfer of ownership, according to an embodiment.

FIG. 3 illustrates a flow diagram 300 of an example of a platform state validation process for trustworthy peripheral transfer of ownership, according to an embodiment.

At operation 305, a signed peripheral firmware measurement may be received. The received peripheral firmware measurement may be used in measuring the current platform state (e.g by the PCR 122) of the computing device 114. The current platform state may be compared to a golden value for the computing device 114. If the current platform state is validated at decision 315, data transfer may be allowed between the computing device 114 and the peripheral device 136 at operation 325. If the current platform state is not validated at decision 315, data transfer between the computing device 114 and the peripheral device 136 may be denied. The platform state validation process ends at operation 330

In an example, remote attestation may be used to validate the current platform state of the computing device 114. The signed peripheral firmware measurement (or the calculated current platform state including the peripheral firmware measurement) may be sent to a remote attestation server am operation 335. The golden value for the computing device 114 stored at the remote attestation server may be compared to the current platform state at operation 310 and the process continues as previously described at decision 315.

Returning to the description of FIG. 1, after onboarding, the peripheral device 136 may have one or more computing device-specific UUID values that are used to identify the peripheral device 136 to the computing device 114 (and other computing devices if it has been onboarded by multiple computing devices). The UUID of the computing device 114 may be signed by the ID key 140 along with a challenge nonce that the IQ controller 130 may supply over a peripheral authentication channel 156 such as, for example, IEEE 1667 or TCG OPAL. The IO controller 130 may authenticate the peripheral device 136 to determine that it has been previously verified by the computing device 114. The peripheral device 136 may support multiple owner computing devices by maintaining multiple device_UUID values in the manifest 104, one for each owner computing device. A policy may specify whether or not the computing device 114 will allow another computing device to be an owner. Policy and physical resources may limit the number of computing devices that may be owners of the peripheral device 136.

Data transfer may be allowed between the peripheral device 136 and the computing device 114 via the bus interconnect based on validation of the measurement of the computing platform against the platform configuration register 122 of the computing device 114. In an example, a challenge response may be transmitted to the peripheral device 136 using an authentication protocol of the computing device 114 bus 124. And the data transfer may be allowed based in part on validation of a challenge response received from the peripheral device 136.

Figure 4:
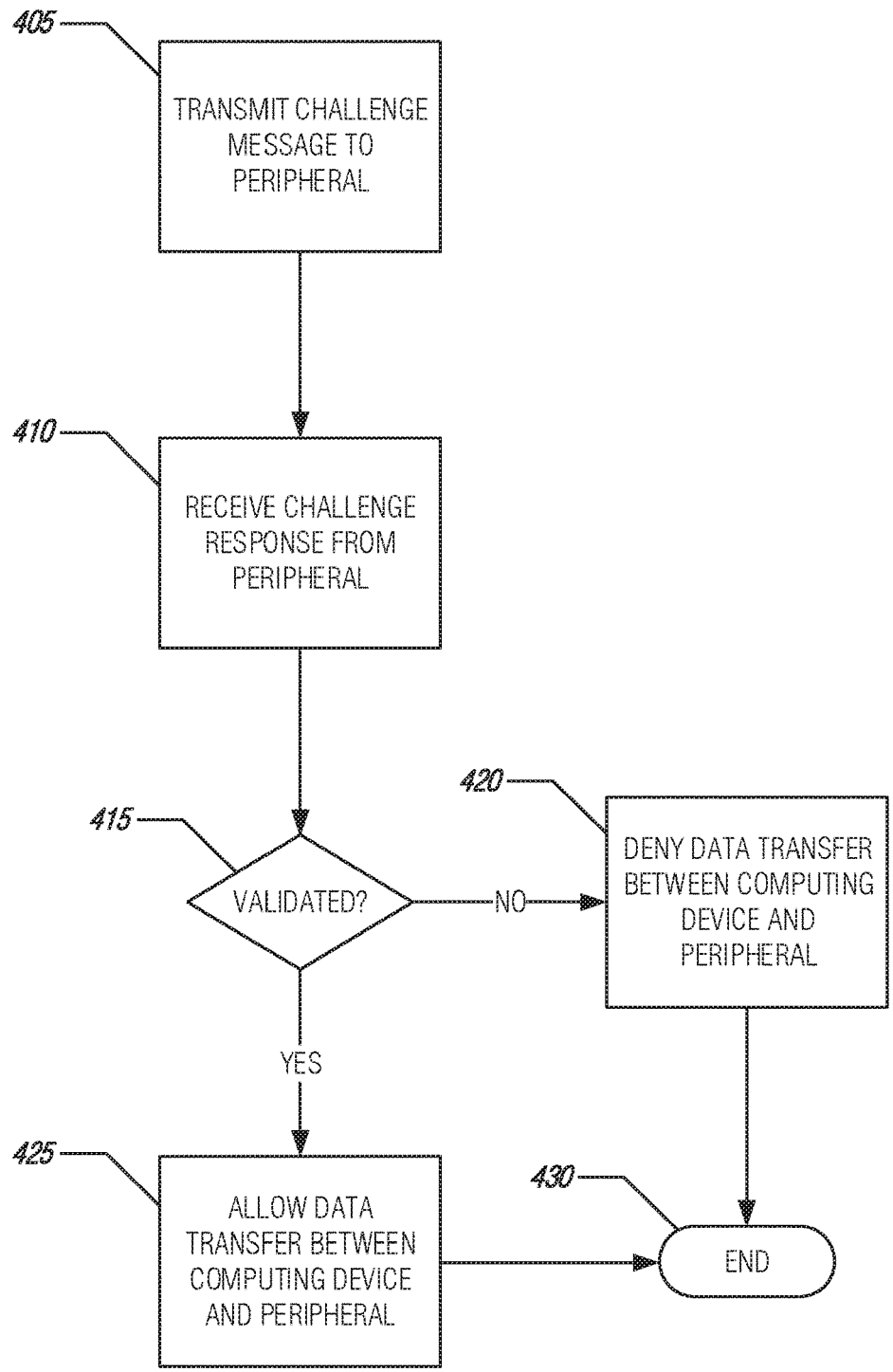
FIG. 4 illustrates a flow diagram of an example of a challenge-response validation process for trustworthy peripheral transfer of ownership, according to an embodiment.

FIG. 4 illustrates a flow diagram 400 of an example of a challenge-response validation process for trustworthy peripheral transfer of ownership, according to an embodiment.

At operation 405, a challenge message may be transmitted to the peripheral device 136. For example, a UUID of the computing device 114 signed with the ID key 140 of the peripheral device 136 may be transmitted to the peripheral device 136 along with a challenge nonce. A response to the challenge message may be received from the peripheral device 136 at operation 410. If the challenge response is validated at operation 415, data transfer between the computing device 114 and the peripheral device 136 may be allowed at operation 425. If the challenge response is not validated at operation 415, data transfer between the computing device 114 and the peripheral device 136 may be denied at operation 420. The process ends at operation 430.

Returning to the description of FIG. 1, the components described above—such as the manifest 104, the computing device 114, the computing device 114 secure device onboarding agent 118, the PCR 122, the computing device 114 bus 124, the system firmware 126, the system firmware 126 secured device onboarding and rendezvous server 128, the IO controller 130, trusted execution environment 132, the TPM 134, the secure memory device 138, the peripheral device 136, the peripheral device 136 secure device onboarding agent 142, the peripheral controller 144, the RTM agent 146, the peripheral device 136 bus 148, and the remote server 158—are structural elements to implement the described techniques. However, one of ordinary skill will readily understand that there are a variety of means to perform these techniques in addition to these examples.

Figure 5:
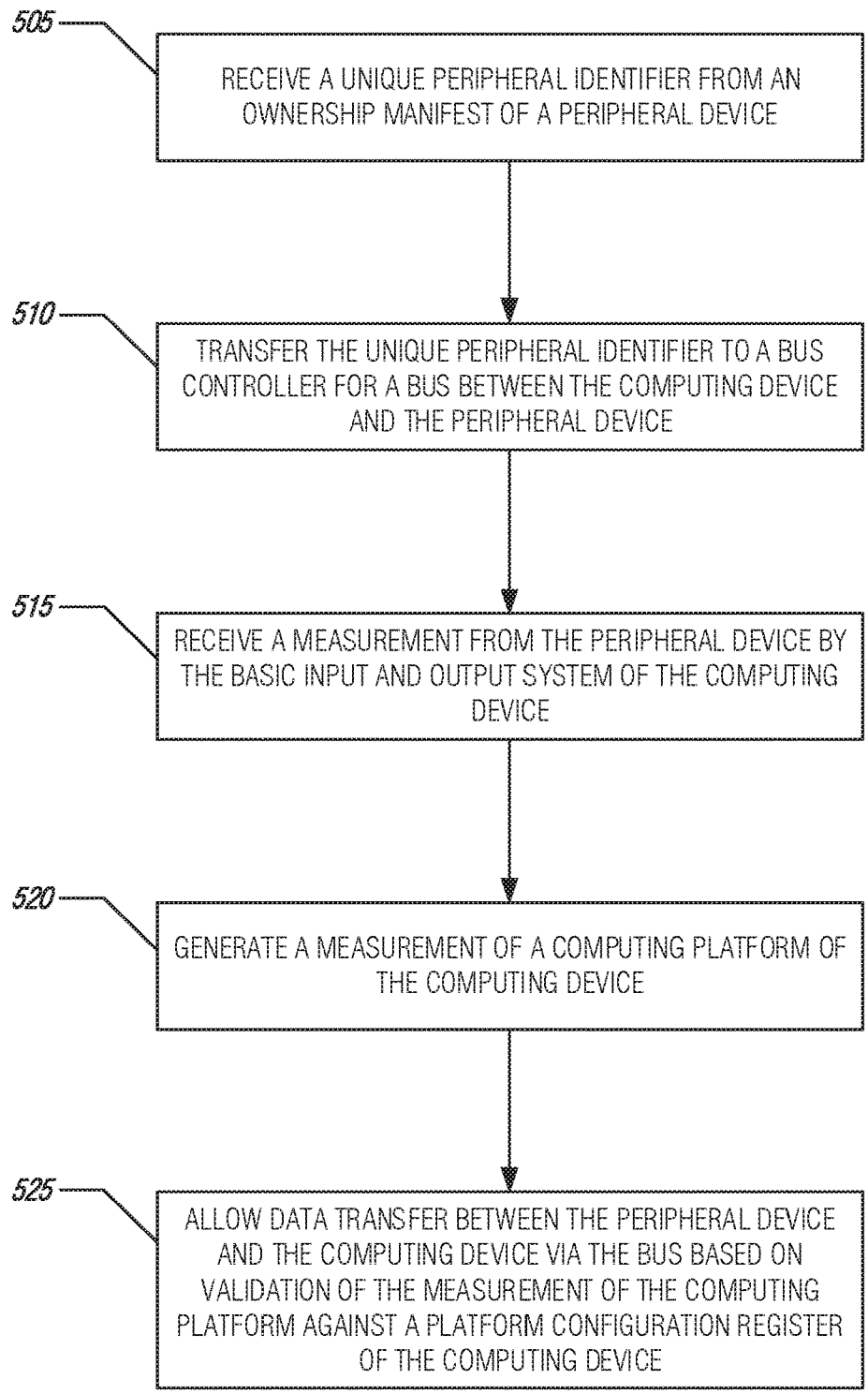
FIG. 5 illustrates an example of a method for implementing trustworthy peripheral transfer of ownership in a computing device, according to an embodiment.

FIG. 5 illustrates an example of a method 500 for implementing trustworthy peripheral transfer of ownership in a computing device, according to an embodiment. The method 500 may provide features as described in FIGS. 1-4.

A unique peripheral identifier may be received from an ownership manifest of the peripheral device (e.g., at operation 505). In an example, the unique peripheral identifier is signed with a key of the peripheral device. The unique peripheral identifier may be transferred to a bus controller for a bus between the computing device and the peripheral device (e.g., at operation 510). In an example, the bus operates according to protocols of an Institute of Electrical and Electronics Engineers (IEEE) 1667 standard or a Trusted Computing Group (TCG) Opal standard.

A measurement may be received from the peripheral device by the basic input and output system of the computing device (e.g., at operation 515). A measurement of a computing platform of the computing device may be generated (e.g., at operation 520). The measurement may indicate peripheral devices interconnected to the computing device. In an example, an initial boot block measurement may be generated for the computing platform of the computing device. The initial boot block measurement may be extended using a measurement from the peripheral device and the measurement of the computing platform may be the extended initial boot block measurement. In an example, the initial boot block measurement is generated by a trusted platform module of the computing device.

Data transfer may be allowed between the peripheral device and the computing device via the bus based on validation of the measurement of the computing platform against a platform configuration register of the computing device (e.g., at operation 525). In an example, a challenge response may be transmitted to the peripheral device using an authentication protocol of the bus and the data transfer may be allowed in part based on validation of a challenge response received from the peripheral device.

In an example, a platform configuration value may be retrieved from a remote attestation server. The current measurement of the computing platform may be compared to the retrieved platform configuration value. The current measurement of the computing platform may be validated based on the comparison and the data transfer may be allowed at least in part based on the validation.

Figure 6:
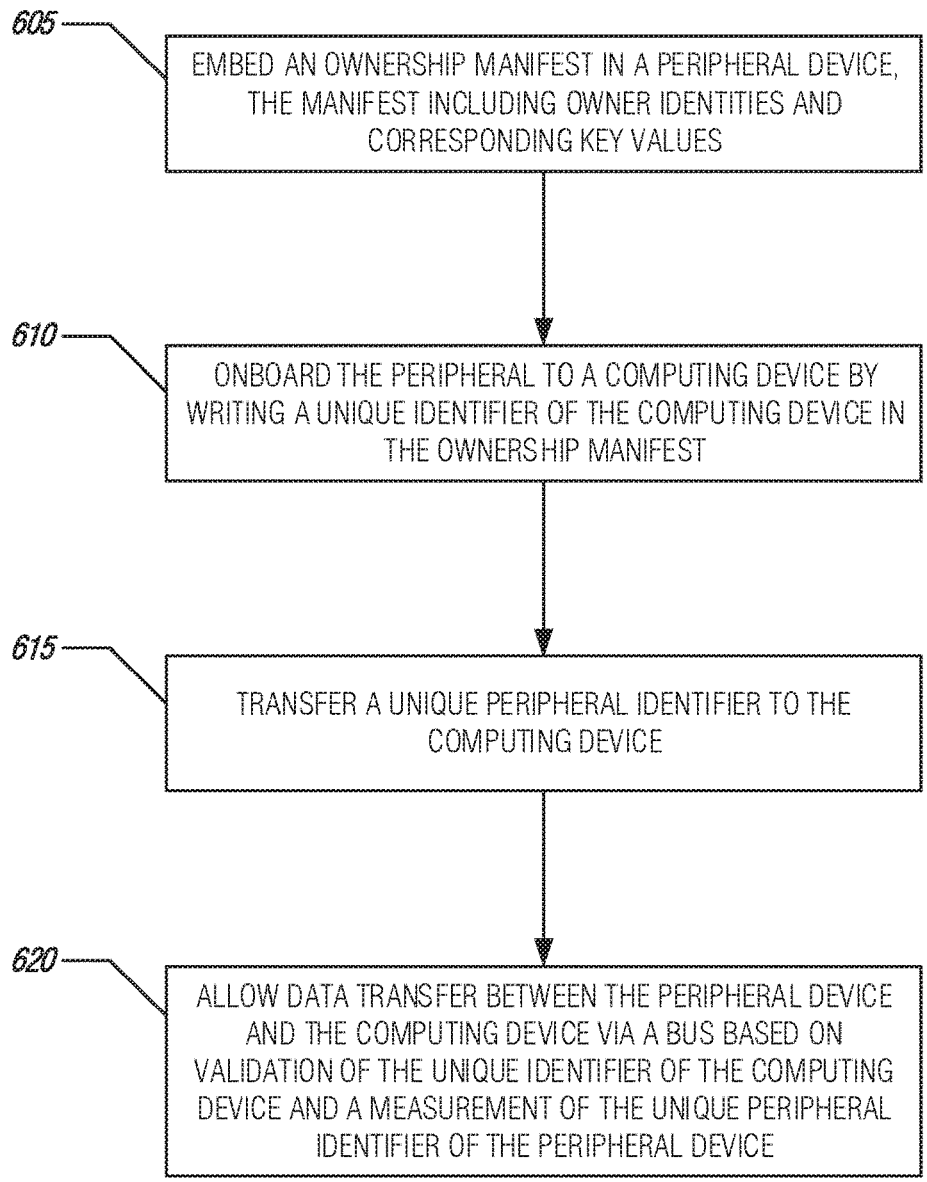
FIG. 6 illustrates an example of a method for implementing trustworthy peripheral transfer of ownership in a peripheral device, according to an embodiment.

FIG. 6 illustrates an example of a method 600 for implementing trustworthy peripheral transfer of ownership in a peripheral device, according to an embodiment. The method 600 may provide features as described in FIGS. 1-5.

An ownership manifest may be embedded in the peripheral device (e.g., at operation 605). The manifest may include owner identities and corresponding key values. In an example, the ownership manifest may be embedded during manufacturing. In an example, a unique identifier of a manufacturer of the peripheral device may be written to the manifest during manufacturing. In an example, unique identifiers of each owner of the peripheral device may be written to the manifest through a supply chain between the manufacturer and the current owner.

The peripheral may be onboarded to a computing device by writing a unique identifier of the computing device in the ownership manifest (e.g., at operation 610). In an example, the unique identifier of the computing device may be signed using a certificate of the peripheral device when writing the unique identifier of the computing device to the manifest. A unique peripheral identifier may be transmitted to the computing device (e.g., at operation 615). In an example, the unique peripheral identifier may be transferred to a secure onboarding agent of the computing device during onboarding.

Data transfer may be allowed between the peripheral device and the computing device via a bus based on validation of the unique identifier of the computing device and a measurement of the unique peripheral identifier of the peripheral device (e.g., at operation 620). In an example, the measurement of the unique peripheral identifier is generated by a trusted measurement agent of the peripheral device. In an example, validation of the unique identifier of the computing device may include receipt of the unique identifier of the computing device via an authentication protocol of the bus and verification that the received unique identifier of the computing device matches the unique identifier of the computing device stored in the manifest.

Figure 7:
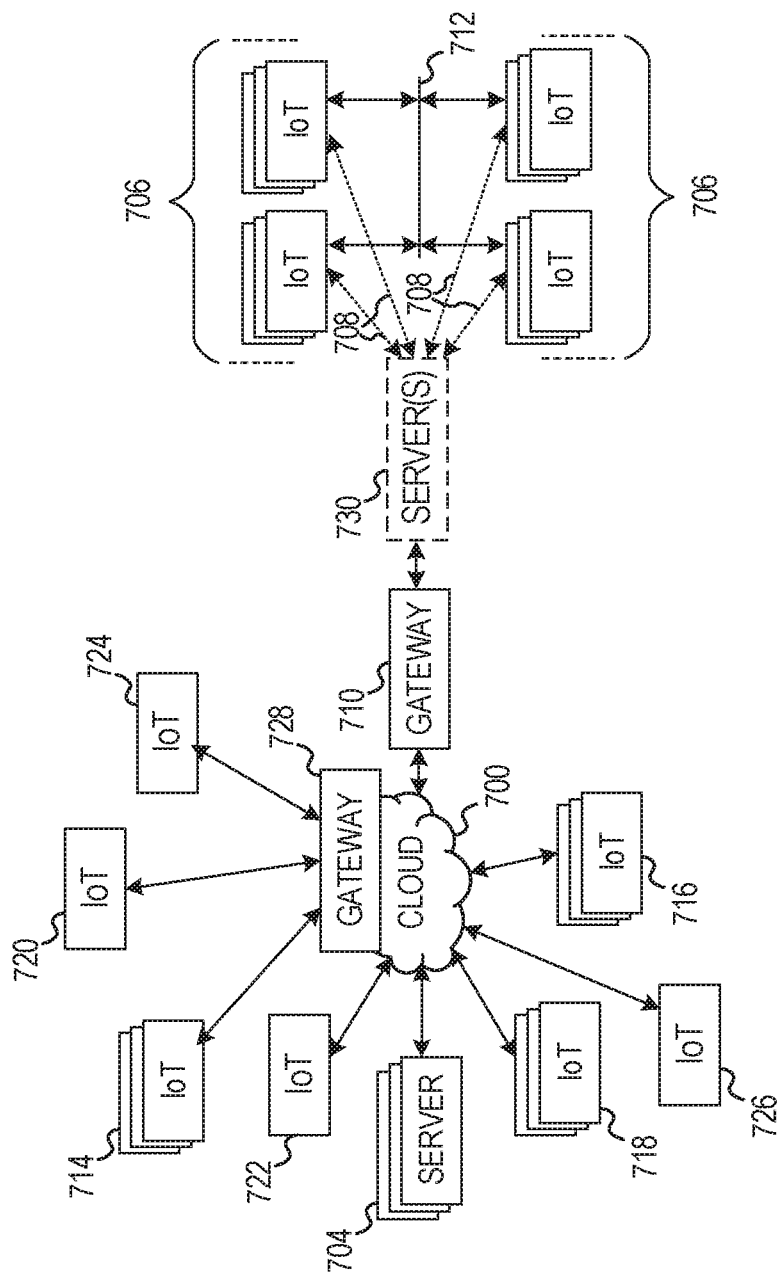
FIG. 7 illustrates a drawing of a cloud-computing network, or cloud, in communication with a number of Internet of Things (IoT) devices.

FIG. 7 illustrates a drawing of a cloud-computing network, or cloud 700, in communication with a number of Internet of Things (IoT) devices. The cloud 700 may represent the Internet, or may be a local area network (LAN), or a wide area network (WAN), such as a proprietary network for a company. The IoT devices may include any number of different types of devices, grouped in various combinations. For example, a traffic control group 706 may include IoT devices along streets in a city. These IoT devices may include stoplights, traffic flow monitors, cameras, weather sensors, and the like. The traffic control group 706, or other subgroups, may be in communication with the cloud 700 through wired or wireless links 708, such as LPWA links, optical links, and the like. Further, a wired or wireless sub-network 712 may enable the IoT devices to communicate with each other, such as through a local area network, a wireless local area network, and the like. The IoT devices may use another device, such as a gateway 710 or 728 to communicate with remote locations such as the cloud 700; the IoT devices may also use one or more servers 730 to facilitate communication with the cloud 700 or with the gateway 710. For example, the one or more servers 730 may operate as an intermediate network node to support a local edge cloud or fog implementation among a local area network. Further, the gateway 728 that is depicted may operate in a cloud-to-gateway-to-many edge devices configuration, such as with the various IoT devices 714, 720, 724 being constrained or dynamic to an assignment and use of resources in the cloud 700.

Other example groups of IoT devices may include remote weather stations 714, local information terminals 716, alarm systems 718, automated teller machines 720, alarm panels 722, or moving vehicles, such as emergency vehicles 724 or other vehicles 726, among many others. Each of these IoT devices may be in communication with other IoT devices, with servers 704, with another IoT fog device or system (not shown, but depicted in FIG. 1), or a combination therein. The groups of IoT devices may be deployed in various residential, commercial, and industrial settings (including in either private or public environments).

As may be seen from FIG. 7, a large number of IoT devices may be communicating through the cloud 700. This may enable different IoT devices to request or provide information to other devices autonomously. For example, a group of IoT devices (e.g., the traffic control group 706) may request a current weather forecast from a group of remote weather stations 714, which may provide the forecast without human intervention. Further, an emergency vehicle 724 may be alerted by an automated teller machine 720 that a burglary is in progress. As the emergency vehicle 724 proceeds towards the automated teller machine 720, it may access the traffic control group 706 to request clearance to the location, for example, by lights turning red to block cross traffic at an intersection in sufficient time for the emergency vehicle 724 to have unimpeded access to the intersection.

Clusters of IoT devices, such as the remote weather stations 714 or the traffic control group 706, may be equipped to communicate with other IoT devices as well as with the cloud 700. This may enable the IoT devices to form an ad-hoc network between the devices, enabling them to function as a single device, which may be termed a fog device or system (e.g., as described above with reference to FIG. 1).

Figure 8:
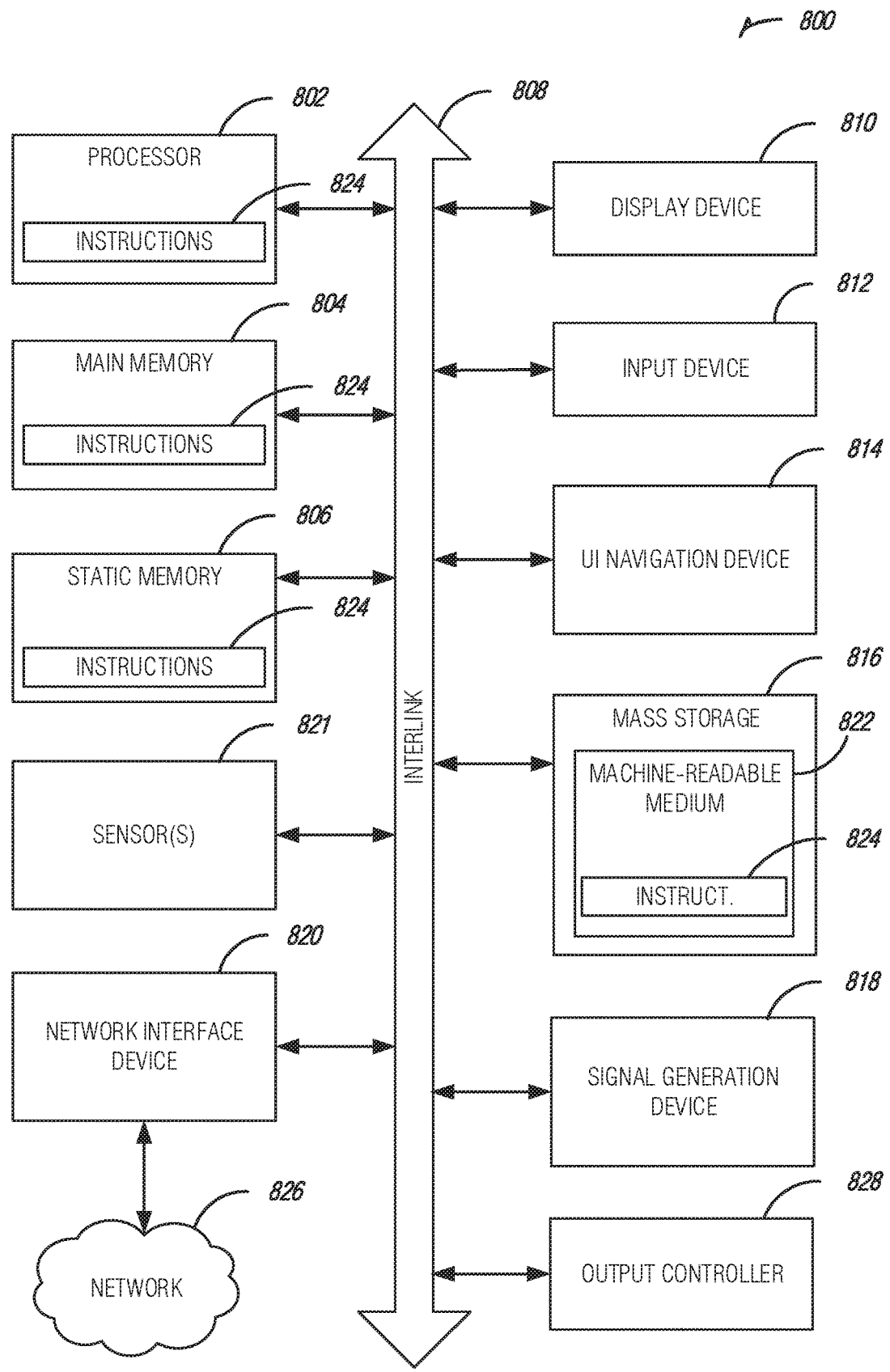
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensors. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine readable media). Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIM), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

ADDITIONAL NOTES & EXAMPLES

Example 1 is a method for trustworthy transfer of ownership and operation of a peripheral device, the method comprising: embedding an ownership manifest in the peripheral device, the manifest including owner identities and corresponding key values; onboarding the peripheral device to a computing device by writing a unique identifier of the computing device in the ownership manifest; transferring a unique peripheral identifier to the computing device; and allowing data transfer between the peripheral device and the computing device via a bus based on validation of the unique identifier of the computing device and a measurement of the unique peripheral identifier of the peripheral device.

In Example 2, the subject matter of Example 1 includes, wherein the ownership manifest is embedded during manufacturing.

In Example 3, the subject matter of Examples 1-2 includes, writing a unique identifier of a manufacturer of the peripheral device to the manifest during manufacturing.

In Example 4, the subject matter of Example 3 includes, writing unique identifiers of each owner of the peripheral device to the manifest through a supply chain between the manufacturer and the current owner.

In Example 5, the subject matter of Examples 1-4 includes, signing the unique identifier of the computing device using a certificate of the peripheral device when writing the unique identifier of the computing device to the manifest.

In Example 6, the subject matter of Examples 1-5 includes, transferring the unique peripheral identifier to a secure onboarding agent of the computing device during onboarding.

In Example 7, the subject matter of Examples 1-6 includes, wherein the measurement of the unique peripheral identifier is generated by a trusted measurement agent of the peripheral device.

In Example 8, the subject matter of Examples 1-7 includes, wherein the validation of the unique identifier of the computing device further comprises: receiving the unique identifier of the computing device via an authentication protocol of the bus; and verifying that the received unique identifier of the computing device matches the unique identifier of the computing device stored in the manifest.

In Example 9, the subject matter of Examples 1-8 includes, generating a local peripheral asymmetric key, wherein the local peripheral asymmetric key includes a hash value of firmware of the peripheral device, and wherein the local peripheral asymmetric key is used to sign the unique peripheral identifier as part of a certificate signing request message delivered to the computing device.

Example 10 is a peripheral device for trustworthy transfer of ownership and operation of the peripheral device, the peripheral device comprising: processing circuitry; a secure memory device including an ownership manifest, the manifest including owner identities and corresponding key values; and memory including instructions that, when executed by the processing circuitry, cause the processing circuitry to perform operations to: onboard the peripheral device to a computing device by writing a unique identifier of the computing device in the ownership manifest; transfer a unique peripheral identifier to the computing device; and allow data transfer between the peripheral device and the computing device via a bus based on validation of the unique identifier of the computing device and a measurement of the unique peripheral identifier of the peripheral device.

In Example 11, the subject matter of Example 10 includes, wherein the ownership manifest is embedded during manufacturing.

In Example 12, the subject matter of Examples 10-11 includes, instructions to write a unique identifier of a manufacturer of the peripheral device to the manifest during manufacturing.

In Example 13, the subject matter of Example 12 includes, instructions to write unique identifiers of each owner of the peripheral device to the manifest through a supply chain between the manufacturer and the current owner.

In Example 14, the subject matter of Examples 10-13 includes, instructions to sign the unique identifier of the computing device using a certificate of the peripheral device when writing the unique identifier of the computing device to the manifest.

In Example 15, the subject matter of Examples 10-14 includes, instructions to transmit the unique peripheral identifier to a secure onboarding agent of the computing device during onboarding.

In Example 16, the subject matter of Examples 10-15 includes, wherein the measurement of the unique peripheral identifier is generated by a trusted measurement agent of the peripheral device.

In Example 17, the subject matter of Examples 10-16 includes, wherein the instructions to validate the unique identifier of the computing device further comprises instructions to: receive the unique identifier of the computing device via an authentication protocol of the bus; and verify that the received unique identifier of the computing device matches the unique identifier of the computing device stored in the manifest.

In Example 18, the subject matter of Examples 10-17 includes, instructions to: generate a local peripheral asymmetric key, wherein the local peripheral asymmetric key includes a hash value of firmware of the peripheral device, and wherein the local peripheral asymmetric key is used to sign the unique peripheral identifier as part of a certificate signing request message delivered to the computing device.

Example 19 is at least one machine readable medium including instructions for trustworthy transfer of ownership and operation of a peripheral device that, when executed by processing circuitry of the peripheral device, cause the processing circuitry to perform operations to: embed an ownership manifest in the peripheral device, the manifest including owner identities and corresponding key values; onboard the peripheral device to a computing device by writing a unique identifier of the computing device in the ownership manifest; transfer a unique peripheral identifier to the computing device; and allow data transfer between the peripheral device and the computing device via a bus based on validation of the unique identifier of the computing device and a measurement of the unique peripheral identifier of the peripheral device.

In Example 20, the subject matter of Example 19 includes, wherein the ownership manifest is embedded during manufacturing.

In Example 21, the subject matter of Examples 19-20 includes, instructions to write a unique identifier of a manufacturer of the peripheral device to the manifest during manufacturing.

In Example 22, the subject matter of Example 21 includes, instructions to write unique identifiers of each owner of the peripheral device to the manifest through a supply chain between the manufacturer and the current owner.

In Example 23, the subject matter of Examples 19-22 includes, instructions to sign the unique identifier of the computing device using a certificate of the peripheral device when writing the unique identifier of the computing device to the manifest.

In Example 24, the subject matter of Examples 19-23 includes, instructions to transmit the unique peripheral identifier to a secure onboarding agent of the computing device during onboarding.

In Example 25, the subject matter of Examples 19-24 includes, wherein the measurement of the unique peripheral identifier is generated by a trusted measurement agent of the peripheral device.

In Example 26, the subject matter of Examples 19-25 includes, wherein the instructions to validate the unique identifier of the computing device further comprises instructions to: receive the unique identifier of the computing device via an authentication protocol of the bus; and verify that the received unique identifier of the computing device matches the unique identifier of the computing device stored in the manifest.

In Example 27, the subject matter of Examples 19-26 includes, instructions to: generate a local peripheral asymmetric key, wherein the local peripheral asymmetric key includes a hash value of firmware of the peripheral device, and wherein the local peripheral asymmetric key is used to sign the unique peripheral identifier as part of a certificate signing request message delivered to the computing device.

Example 28 is a method for trustworthy transfer of ownership and operation of a peripheral device, the method comprising: receiving, by a computing device, a unique peripheral identifier from an ownership manifest of the peripheral device; transferring the unique peripheral identifier to a bus controller for a bus between the computing device and the peripheral device; receiving a measurement from the peripheral device by system firmware of the computing device; generating a measurement of a computing platform state of the computing device, wherein the measurement indicates peripheral devices interconnected to the computing device; and allowing data transfer between the peripheral device and the computing device via the bus based on validation of the measurement of the computing platform state against a platform configuration register of the computing device.

In Example 29, the subject matter of Example 28 includes, wherein allowing data transfer between the peripheral device and the computing device further comprises: transmitting a challenge response to the peripheral device using an authentication protocol of the bus; and allowing the data transfer based in part on validation of a challenge response received from the peripheral device.

In Example 30, the subject matter of Examples 28-29 includes, wherein the unique peripheral identifier is signed with a key of the peripheral device.

In Example 31, the subject matter of Examples 28-30 includes, retrieving a platform configuration value from a remote attestation server; comparing the current measurement of the computing platform state to the retrieved platform configuration value; and validating the current measurement of the computing platform state based on the comparison, wherein allowing the data transfer is based at least in part on the validation.

In Example 32, the subject matter of Examples 28-31 includes, generating an initial boot block measurement for the computing platform state of the computing device; and extending the initial boot block measurement using a measurement from the peripheral device, wherein the measurement of the computing platform state is the extended initial boot block measurement.

In Example 33, the subject matter of Example 32 includes, wherein the initial boot block measurement is generated by a trusted platform module of the computing device.

In Example 34, the subject matter of Examples 28-33 includes, wherein the bus operates according to protocols of an Institute of Electrical and Electronics Engineers (IEEE) 1667 standard or a Trusted Computing Group (TCG) Opal standard.

In Example 35, the subject matter of Examples 28-34 includes, receiving a local device key issued by a server agent, wherein the local device key is used to sign a certificate signing request message received from the peripheral device, wherein the certificate signing request message includes the unique peripheral identifier signed by the peripheral device.

Example 36 is a computing device for trustworthy transfer of ownership and operation of a peripheral device, the computing device comprising: processing circuitry; and memory including instructions that, when executed by the processor circuitry, cause the processing circuitry to perform operations to: receive a unique peripheral identifier from an ownership manifest of the peripheral device; transfer the unique peripheral identifier to a bus controller for a bus between a computing device and the peripheral device; receive a measurement from the peripheral device by system firmware of the computing device; generate a measurement of a computing platform state of the computing device, wherein the measurement indicates peripheral devices interconnected to the computing device; and allow data transfer between the peripheral device and the computing device via the bus based on validation of the measurement of the computing platformsstate against a platform configuration register of the computing device.

In Example 37, the subject matter of Example 36 includes, wherein the instructions to allow data transfer between the peripheral device and the computing device further comprises instructions to: transmit a challenge response to the peripheral device using an authentication protocol of the bus; and allow the data transfer based in part on validation of a challenge response received from the peripheral device.

In Example 38, the subject matter of Examples 36-37 includes, wherein the unique peripheral identifier is signed with a key of the peripheral device.

In Example 39, the subject matter of Examples 36-38 includes, instructions to: retrieve a platform configuration value from a remote attestation server; compare the current measurement of the computing platform state to the retrieved platform configuration value; and validate the current measurement of the computing platform state based on the comparison, wherein the instructions to allow the data transfer include using the validation.

In Example 40, the subject matter of Examples 36-39 includes, instructions to: generate an initial boot block measurement for the computing platform state of the computing device; and extend the initial boot block measurement using a measurement from the peripheral device, wherein the measurement of the computing platform state is the extended initial boot block measurement.

In Example 41, the subject matter of Example 40 includes, wherein the initial boot block measurement is generated by a trusted platform module of the computing device.

In Example 42, the subject matter of Examples 36-41 includes, wherein the bus operates according to protocols of an Institute of Electrical and Electronics Engineers (IEEE) 1667 standard or a Trusted Computing Group (TCG) Opal standard.

In Example 43, the subject matter of Examples 36-42 includes, instructions to: receive a local device key issued by a server agent, wherein the local device key is used to sign a certificate signing request message received from the peripheral device, wherein the certificate signing request message includes the unique peripheral identifier signed by the peripheral device.

Example 44 is at least one machine readable medium including instructions for trustworthy transfer of ownership and operation of a peripheral device that, when executed by processing circuitry of a computing device, cause the processing circuitry to perform operations to: receive a unique peripheral identifier from an ownership manifest of the peripheral device; transfer the unique peripheral identifier to a bus controller for a bus between the computing device and the peripheral device; receive a measurement from the peripheral device by system firmware of the computing device; generate a measurement of a computing platform state of the computing device, wherein the measurement indicates peripheral devices interconnected to the computing device; and allow data transfer between the peripheral device and the computing device via the bus based on validation of the measurement of the computing platform state against a platform configuration register of the computing device.

In Example 45, the subject matter of Example 44 includes, wherein the instructions to allow data transfer between the peripheral device and the computing device further comprises instructions to: transmit a challenge response to the peripheral device using an authentication protocol of the bus; and allow the data transfer based in part on validation of a challenge response received from the peripheral device.

In Example 46, the subject matter of Examples 44-45 includes, wherein the unique peripheral identifier is signed with a key of the peripheral device.

In Example 47, the subject matter of Examples 44-46 includes, instructions to: retrieve a platform configuration value from a remote attestation server; compare the current measurement of the computing platform state to the retrieved platform configuration value; and validate the current measurement of the computing platform state based on the comparison, wherein the instructions to allow the data transfer include using the validation.

In Example 48, the subject matter of Examples 44-47 includes, instructions to: generate an initial boot block measurement for the computing platform state of the computing device; and extend the initial boot block measurement using a measurement from the peripheral device, wherein the measurement of the computing platform state is the extended initial boot block measurement.

In Example 49, the subject matter of Example 48 includes, wherein the initial boot block measurement is generated by a trusted platform module of the computing device.

In Example 50, the subject matter of Examples 44-49 includes, wherein the bus operates according to protocols of an Institute of Electrical and Electronics Engineers (IEEE) 1667 standard or a Trusted Computing Group (TCG) Opal standard.

In Example 51, the subject matter of Examples 44-50 includes, instructions to: receive a local device key issued by a server agent, wherein the local device key is used to sign a certificate signing request message received from the peripheral device, wherein the certificate signing request message includes the unique peripheral identifier signed by the peripheral device.

Example 52 is at least one machine-readable medium including instructions that, when executed by processing circuitry, cause the processing circuitry to perform operations to implement of any of Examples 1-51.

Example 53 is an apparatus comprising respective means to implement of any of Examples 1-51.

Example 54 is a system to implement of any of Examples 1-51.

Example 55 is a method to implement of any of Examples 1-51.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A computing device for trustworthy transfer of ownership and operation of a peripheral device, the computing device comprising: processing circuitry; and memory including instructions that, when executed by the processor circuitry, cause the processing circuitry to perform operations to: receive a unique peripheral identifier from an ownership manifest of the peripheral device; transfer the unique peripheral identifier to a bus controller for a bus between a computing device and the peripheral device; receive a measurement from the peripheral device by system firmware of the computing device; generate a measurement of a computing platform state of the computing device, wherein the measurement indicates peripheral devices interconnected to the computing device; and allow data transfer between the peripheral device and the computing device via the bus based on validation of the measurement of the computing platform state against a platform configuration register of the computing device, wherein the instructions to allow data transfer between the peripheral device and the computing device further comprises instructions to: transmit a challenge response to the peripheral device using an authentication protocol of the bus; and allow the data transfer based in part on validation of a challenge response received from the peripheral device.

2. The computing device of claim 1, wherein the unique peripheral identifier is signed with a key of the peripheral device.

3. The computing device of claim 1, further comprising instructions to: retrieve a platform configuration value from a remote attestation server; compare the current measurement of the computing platform state to the retrieved platform configuration value; and validate the current measurement of the computing platform state based on the comparison, wherein the instructions to allow the data transfer include using the validation.

4. The computing device of claim 1, further comprising instructions to: generate an initial boot block measurement for the computing platform state of die computing device; and extend the initial boot block measurement using a measurement from the peripheral device, wherein the measurement of the computing platform state is the extended initial boot block measurement.

5. The computing device of claim 4, wherein the initial boot block measurement is generated by a trusted platform module of the computing device.

6. The computing device of claim 1, wherein the bus operates according to protocols of an Institute of Electrical and Electronics Engineers (IEEE) 1667 standard or a Trusted Computing Group (TCG) Opal standard.

7. The computing device of claim 1, further comprising instructions to: receive a local device key issued by a server agent, wherein the local device key is used to sign a certificate signing request message received from the peripheral device, wherein the certificate signing request message includes the unique peripheral identifier signed by the peripheral device.

8. At least one non-transitory machine readable medium including instructions for trustworthy transfer of ownership and operation of a peripheral device that, when executed by processing circuitry of a computing device, cause the processing circuitry to perform operations to: receive a unique peripheral identifier from an ownership manifest of h peripheral device; transfer the unique peripheral identifier to a bus controller for a bus between the computing device and the peripheral device; receive a measurement from the peripheral device by system firmware of the computing device; generate a measurement of a computing platform state of the computing device, wherein the measurement indicates peripheral devices interconnected to the computing device; and allow data transfer between the peripheral device and the computing device via the bus based on validation of the measurement of the computing platform state against a platform configuration register of the computing device, wherein the instructions to allow data transfer between the peripheral device and the computing device further comprises instructions to: transmit a challenge response to the peripheral device using an authentication protocol of the bus; and allow the data transfer based in part on validation of a challenge response received from the peripheral device.

9. The at least one machine readable medium of claim 1, further comprising instructions to: retrieve a platform configuration value from a remote attestation server; compare the current measurement of the computing platform state to the retrieved platform configuration value; and validate the current measurement of the computing platform state based on the comparison, wherein the instructions to allow the data transfer include using the validation.

10. The at least one machine readable medium of claim 8, further comprising instructions to: generate an initial boot block measurement for the computing platform state of the computing device; and extend the initial boot block measurement using a measurement from the peripheral device, wherein the measurement of the computing platform state is the extended initial boot block measurement.

11. The at least one machine readable medium of claim 10, wherein the initial boot block measurement is generated by a trusted platform module of the computing device.

12. A method for trustworthy transfer of ownership and operation of a peripheral device, the method comprising: receiving, by a computing device, a unique peripheral identifier from an ownership manifest of the peripheral device; transferring the unique peripheral identifier to a bus controller for a bus between the computing device and the peripheral device; receiving a measurement from the peripheral device by system firmware of the computing device; generating a measurement of a computing platform state of the computing device, wherein the measurement indicates peripheral devices interconnected to the computing device; and allowing data transfer between the peripheral device and the computing device via the bus based on validation of the measurement of the computing platform state against a platform configuration register of the computing device, wherein the instructions to allow data transfer between the peripheral device and the computing device further comprises instructions to: transmit a challenge response to the peripheral device using an authentication protocol of the bus; and allow the data transfer based in part on validation of a challenge response received from the peripheral device.

13. The method of claim 12, further comprising: retrieving a platform configuration value from a remote attestation server; comparing the current measurement of the computing platform state to the retrieved platform configuration value; and validating the current measurement of the computing platform state based on the comparison, wherein allowing the data transfer is based at least in part on the validation.

14. The method of claim 12, further comprising: generating an initial boot block measurement for the computing platform state of the computing device; and extending the initial boot block measurement using a measurement from the peripheral device, wherein the measurement of the computing platform state is the extended initial boot block measurement.

15. The method of claim 12, wherein the bus operates according to protocols of an Institute of Electrical and Electronics Engineers (IEEE) 1667 standard or a Trusted Computing Group (TCG) Opal standard.

16. A peripheral device for trustworthy transfer of ownership and operation of the peripheral device, the peripheral device comprising: processing circuitry; a secure memory device including an ownership manifest, the manifest including owner identities and corresponding key values; and memory including instructions that, when executed by the processing circuitry, cause the processing circuitry to perform operations to: onboard the peripheral device to a computing device by writing a unique identifier of the computing device in the ownership manifest; transfer a unique peripheral identifier to the computing device; and allow data transfer between the peripheral device and the computing device via a bus based on validation of the unique identifier of the computing device and a measurement of the unique peripheral identifier of the peripheral device, wherein the instructions to allow data transfer between the peripheral device and the computing device further comprises instructions to: transmit a challenge response to the peripheral device using an authentication protocol of the bus; and allow the data transfer based in part on validation of a challenge response received from the peripheral device.

17. The peripheral device of claim 16, further comprising instructions to write a unique identifier of a manufacturer of the peripheral device to the manifest during manufacturing.

18. The peripheral device of claim 17, further comprising instructions to write unique identifiers of each owner of the peripheral device to the manifest through a supply chain between the manufacturer and the current owner.

19. The peripheral device of claim 16, further comprising instructions to sign the unique identifier of the computing device using a certificate of the peripheral device when writing the unique identifier of the computing device to the manifest.

20. The peripheral device of claim 16, farther comprising instructions to transmit the unique peripheral identifier to a secure onboarding agent of the computing device during onboarding.

21. The peripheral device of claim 16, wherein the measurement of the unique peripheral identifier is generated by a trusted measurement agent of the peripheral device.

22. The peripheral device of claim 16, in the instructions to validate the unique identifier of the computing device further comprises instructions to: receive the unique identifier of the computing device via an authentication protocol of the bus; and verify that the received unique identifier of the computing device matches the unique identifier of the computing device stored in the manifest.

23. The peripheral device of claim 16, further comprising instructions to: generate a local peripheral asymmetric key, wherein the local peripheral asymmetric key includes a hash value of firmware of the peripheral device, and wherein the local peripheral asymmetric key is used to sign the unique peripheral identifier as part of a certificate signing request message delivered to the computing device.

* * * * *